Sept. 13, 1927.
E. L. CONNELL
ELECTRIC SWITCH
Original Filed April 20, 1922
Re. 16,737
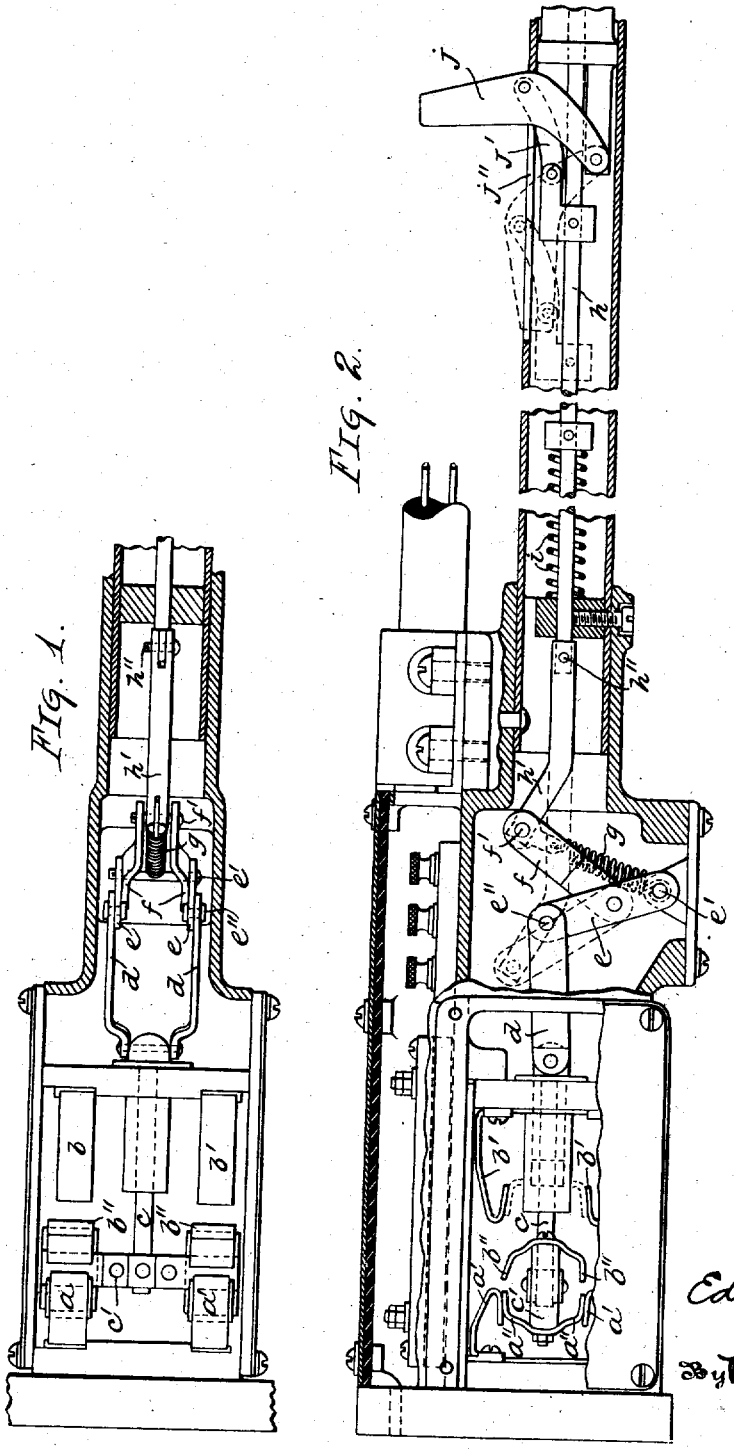
Inventor
Edwin L. Connell
By Brockett, Hyde + Milbourn
Attorneys Reissued Sept. 13, 1927. Re. 16,737

UNITED STATES PATENT OFFICE.

EDWIN L. CONNELL, OF CLEVELAND, OHIO, ASSIGNOR TO THE VAN DORN ELECTRIC TOOL COMPANY, OF CLEVELAND, OHIO, A CORPORATION OF OHIO.

ELECTRIC SWITCH.

Original No. 1,471,308, dated October 16, 1923, Serial No. 555,786, filed April 20, 1922. Application for reissue filed February 8, 1924. Serial No. 691,514.

My invention relates to improvements in electric switches of the type which is adapted to effect a break and make of the contact at either throw of the switching member, and has for its object the effective control of two distinct circuits with instant breaks of each circuit by the provision of quick-acting, spring-controlled apparatus.

My invention may be advantageously explained in connection with the accompanying drawings illustrating a plunger-actuated switch governing two sets of make and break contacts, which are adapted to control two individual electric circuits.

In the apparatus herein shown as embodying my invention there is provided a toggle connection with the actuating lever, which is disposed closely adjacent to the pivotal mounting of the lever and is adapted to effect substantially an instantaneous movement of the lever and its associated parts when the toggle is forced past the center under the tension of the controlling spring.

The features of this improvement may be further explained and the advantages of operation pointed out by making reference to the accompanying drawings, wherein:

Figure 1 is a fragmentary view of the apparatus shown partly in section and with the top removed, and Figure 2 is a vertical section of the apparatus partly broken away and shown in full at the left.

The same character of reference is employed for indicating identical parts wherever shown in these drawings.

The switching device proper is shown at the extreme left of the two figures of the drawings, respectively in plan and side views; being of the plunger type with two sets of opposing contacts $a$, $a'$, and $b$, $b'$, which in practice may be connected for the control of independent circuits, as desired.

A plunger $c$ carrying an insulating cross head $c'$ mounting paired sets of contacts $a''$ and $b''$, is movable bodily, as distinguished from pivotal movement, by means of the links $d$ pivotally connected at $e''$, with the free ends of the paired pivoted actuating levers $e$. These actuating levers are connected near their pivotal mounting $e'$ with the paired overthrow members $f$, and a coil spring $g$ is connected and tensioned between the pivotal mounting of the levers $e$ and the upper end of members $f$, thus forming the active actuating means for the toggle lever mechanism shown.

Members $f$ are bent toward each other and are united by the cross pin $f'$ with the angularly bent end $h'$ of the plunger rod $h$. This plunger rod has a coiled spring $i$ which is tensioned normally to force the rod and connected parts toward the right of the appliance as viewed in the drawings; said angular end $h'$ being pivoted at $h''$ to move with the rod. A controlling lever $j$ mounted in the casing is connected with the plunger rod $h$ by means of a link $j'$, and when this controlling lever is actuated upon its pivot into the dotted line position it is evident that the plunger rod will be forced to the left, thereby compressing the spring $i$ and actuating the toggle mechanism and connected switch parts.

The operation of said toggle mechanism is accomplished with greater speed and certainty and with less danger of arcing than any switching appliance of the prior art with which I am acquainted. Because of the particular manner of connecting the several parts of the actuating mechanism, initial movement of plunger rod $h$ to the left, as viewed in the figures of the drawing, will not disturb the engagement between contacts $a$, $a'$ and $a''$, but on the other hand such initial movement of the plunger rod will tend to maintain said contact in undisturbed engagement until the longitudinal axis of spring $g$ is moved to the other side of the pivotal point $f''$; whereupon the contact $a''$ will be snapped at once from full contact position. In other words, the initial movement of rod $h$ to the left will transmit force through links $f$ and $e$ so as to tend to move links $d$ also towards the left, that is, towards seating engagement. It will be understood that the tensioned spring $g$ is acting between the pin $f'$ and the pivotal mounting $e'$, so that, the toggle being reversed in position, the actuating levers will be suddenly forced to the right and the plunger $c$ will snap contacts $a''$ out of full seating engagement with the springs $a$, $a'$, and instantaneously break the circuit and establish circuit between contacts $b''$ and contacts $b$, $b'$.

It will be apparent that the movement of these contacts is attained with the added rapidity insured by the action of the overthrow members against the actuating levers close to their pivotal mounting $e'$, so that an exceedingly quick break is insured irrespective of the speed with which the trigger or controlling lever $j$ is depressed into the dotted line position. When this trigger is manually released from its extreme position within the casing slotted at $j''$ to receive said trigger, spring $i$ immediately acts to retract the plunger rod $h$ toward the right and the toggle mechanism once more being reversed in position, will cause the switch parts to disengage the contacts $b$, $b'$, $b''$ instantaneously, and reengage contacts $a$, $a'$, $a''$. However, in the same manner as above explained, the initial movement of the plunger rod to the right will tend to maintain the contacts $b$, $b'$, $b''$, in full and undisturbed engagement until the longitudinal axis of spring $g$ is moved beyond the pivotal point $f''$, whereupon the contact $a''$ will be snapped at once from full contact position. The initial movement of rod $h$ to the right tends to move links $d$ also to the right, that is towards seating engagement.

Thus, I have devised an improved mechanism that is not only quick-acting in its operation of the switch but one which also prevents arcing between the contact members.

Having now described the preferred embodiment of my invention, I claim herein and desire to secure rights therein as follows.

1. In an electric switch, the combination of a fixed contact member, a slidable contact member for engagement therewith, operating means for said slidable contact member, and means adapted to be energized by said operating means preparatory to effecting quick-acting opening movement of said slidable contact member, said parts being so constructed and arranged that actuation of said operating means during the preliminary stage of energization of said other means tends to maintain said slidable contact member in engagement with said fixed contact member.

2. In an electric switch, the combination of a fixed contact member, a slidable contact member for engagement therewith, operating means for said slidable contact member, and spring means adapted to be energized by said operating means preparatory to effecting quick-acting opening movement of said slidable contact member, said parts being so constructed and arranged that actuation of said operating means during the preliminary stage of energization of said spring means tends to maintain said slidable contact member in engagement with said fixed contact member.

3. In an electric switch, the combination of a fixed contact member, a bodily movable contact member for engagement therewith, operating means for said movable contact member, connecting levers between said operating means and said movable contact member, said parts being so constructed and arranged that movement of said operating means in one direction tends to exert a force in the same direction upon said movable contact member, and quick-acting means controlled by said operating means for effecting movement of said movable contact member in the opposite direction at a predetermined point in the actuation of said connecting levers.

4. In an electric switch, the combination of a fixed contact member, a body movable contact member for engagement therewith, operating means for said movable contact member, connecting levers between said operating means and said movable contact member, said parts being so constructed and arranged that movement of said operating means in one direction tends to exert a force in the same direction upon said movable contact member, and a spring operatively connected with said levers and controlled by said operating means for effecting quick movement of said movable contact member in the opposite direction at a predetermined point in the actuation of said connecting levers.

5. In an electric switch, the combination of a fixed contact member, a movable contact member for engagement therewith, operating means for said movable contact member, a toggle lever mechanism between said operating means and said movable contact member, said parts being so constructed and arranged that movement of said operating means in one direction tends to exert a force in the same direction upon said movable contact member, and a spring operatively connected with said toggle lever mechanism and controlled by said operating means for effecting quick movement of said movable contact member in the opposite direction at a predetermined point in the actuation of said toggle lever mechanism.

6. In an electric switch, the combination of a fixed contact member, a movable contact member for engagement therewith, toggle members extending in a direction generally transverse to the direction of movement of said movable contact member, a spring connected to said toggle members on opposite sides of the joint between said members and tending to break the toggle, and means for flexing the said toggle members in opposite directions but without tending to disturb the closed condition of the switch until moved beyond straightened position, whereupon full actuation of said movable contact member is quickly effected by said spring.

7. In an electric switch, the combination with paired stationary contacts, of a travelling contact member, a contact thereon adapted to engage said paired contacts, and toggle actuating mechanism for said member, comprising a pivoted actuating lever connected at a distance beyond its pivot with said member, an overthrow member connected with said lever adjacent to its pivotal mounting, a spring interposed between the respective pivotal mountings, and means for actuating the overthrow member into alternative operative positions for tensioning and suddenly releasing the spring, substantially as set forth.

8. In an electric switch of the class described, the combination with paired stationary contacts, of a travelling contact-making member adapted to electrically close with said paired contacts, and a toggle actuating mechanism connected with said member, comprising a pivoted actuating lever, an overthrow member pivoted upon said actuating lever near its pivotal mounting, a spring connecting the extremities of said parts in tensioned relation, and a controlling part associated with said overthrow member, adapted to force it into alternative positions of reaction upon the actuating lever from the opposite sides of and near its pivotal mounting, substantially as set forth.

9. In an electric switch of the class described, the combination with opposing paired electrical contacts, of a travelling contact-making member adapted alternatively to close with said paired sets of contacts, and a toggle actuating mechanism connected to effect the travel of said member, comprising a pivoted actuating lever connected adjacent to its outer end with the contact-making member, an overthrow member pivoted upon said actuating lever near its pivotal mounting, a spring connecting the outer extremities of said parts in tensioned relation, a plunger controlling the overthrow member and a spring associated with the plunger and normally adapted to hold it in its retracted position, substantially as set forth.

10. In an electric switch of the class described, the combination with paired stationary contacts, of a travelling contact-making member, adapted to electrically close with said paired contacts, and a toggle actuating mechanism connected with said member, comprising a pivoted actuating lever connected with said member at a distance from its pivotal mounting, an overthrow member connected with said actuating lever in position to react thereon from opposite sides, and a spring interposed between the respective pivotal mountings of said parts, adapted to effect the sudden actuation of the lever and its connected contact-making member, substantially as set forth.

11. In an electric switch, the combination of a fixed contact member, a slidable contact member for engagement therewith, operating means therefor having a direct connection with said slidable contact member, and means adapted to be energized by said operating means preparatory to effecting quick-acting opening movement of said slidable contact member, said parts being so constructed and arranged that actuation of said operating means during the preliminary stage of energizing said other means tends through said direct connection to maintain said slidable contact member in engagement with said fixed contact member.

In testimony whereof I do now affix my signature.

EDWIN L. CONNELL.